United States Patent [19]

Lautzenhiser et al.

[11] Patent Number: 4,581,932
[45] Date of Patent: Apr. 15, 1986

[54] TUNED BOREHOLE GRAVITY GRADIOMETER

[75] Inventors: Theodore V. Lautzenhiser; Anthony G. Nekut, Jr., both of Tulsa, Okla.

[73] Assignee: Standard Oil Company, Chicago, Ill.

[21] Appl. No.: 684,815

[22] Filed: Dec. 20, 1984

[51] Int. Cl.[4] ............................................. G01M 1/12
[52] U.S. Cl. .................................................. 73/382 G
[58] Field of Search ............................... 73/382 G, 383

[56] References Cited

U.S. PATENT DOCUMENTS 2,089,164  8/1937  Imhof .................................... 73/383

FOREIGN PATENT DOCUMENTS 223252  10/1925  United Kingdom .................. 73/383
1149037  4/1969  United Kingdom ............. 73/382 G

OTHER PUBLICATIONS

Brown and Lautzenhiser, "The Effect of Dipping Beds on a Borehole Gravimeter Survey", Jan. 1982, Geophysics, v. 47, No. 1, pp. 25-30.

Primary Examiner—Stewart J. Levy
Assistant Examiner—Robert R. Raevis
Attorney, Agent, or Firm—Timothy D. Stanley

[57] ABSTRACT

A tuned borehole gravity gradiometer comprises a dipole mass system having means for selectively tuning the sensitivity of the gravity gradiometer to detect variations in the earth's gravity gradient within a borehole. The tuning means includes varying the metacentric height of the dipole mass system by selectively varying the center of gravity of the dipole mass system with respect to the metacenter of the dipole mass system.

10 Claims, 6 Drawing Figures

TUNED BOREHOLE GRAVITY GRADIOMETER

BACKGROUND OF THE INVENTION

The present invention relates generally to the field of borehole gravity gradiometers. Specifically an apparatus for measuring borehole gravity gradient is provided with means for selectively tuning the gravity gradient detection sensitivity of the apparatus.

Variations in the gravitational field and gravity gradient can provide an estimate of various subterranean formations. Additionally, gravity gradient measurements from a borehole are of interest to exploration geophysicists due to their simple, direct relationship with the subterranean formation density surrounding the borehole.

Presently, a variety of apparatuses are available to measure borehole gravity gradients. First, a borehole gravity meter, e.g., LaCoste-Romberg, as described by A. R. Brown and T. V. Lautzenhiser, Geophysics, v. 47, January, 1982, p. 25-30, can be employed to measure gravity at selected depths within a borehole from which an average gravity gradient can be computed. Second, a borehole gravity gradient can be obtained directly from a suspended dipole mass gravity gradiometer.

Looking to FIG. 1, a suspended dipole mass gravity gradiometer A comprising a dipole mass system D having a pair of symmetrically distributed masses m attached to a beam B is shown. The beam B is suspended from its midpoint with a suspension ribbon R such that the beam B is free to rotate about a horizontal axis, e.g., x or y axis. A gravity gradient, for example, $$G_{zx} = \frac{G_z(x + \Delta x) - G_z(x)}{\Delta x} \quad (1)$$

can produce a measurable torque $N_g$ and angular displacement $\theta$ of the dipole mass system D from a reference or equilibrium position can be sensed and recorded.

The angular displacement $\theta$ of the dipole mass system D from its equilibrium or reference position is proportional to the square of the period of the natural oscillation for the dipole mass system D about the rotational axis and the torque $N_g$ applied to the dipole masses m by the gravity gradient $G_{zx}$. Hence, the sensitivity of the suspended dipole mass gravity gradiometer A can be characterized by its natural period.

Since the dipole mass system D is suspended by a fine metallic ribbon R, a resistive torque $N_r$ is developed due to the resistance of the metallic ribbon R to flexure or bending. As such, the actual sensitivity of the suspended dipole mass gravity gradiometer A is significantly reduced because the torque required to bend metallic ribbon R tends to reduce the angle of displacement $\theta$ from the equilibrium or reference position.

One way to decrease the resistive torque $N_r$ for bending the metallic ribbon R is to reduce the cross-sectional area of metallic ribbon R, i.e., a thinner ribbon. However, this also has the effect of decreasing the load-bearing capabilities of the metallic ribbon R and as well as the moment of inertia of the dipole mass system D which is counterproductive to increasing the sensitivity of the gravity gradiometer A.

SUMMARY OF THE INVENTION

The present invention generally relates to the field of borehole gravity gradiometers. A selectively tuned borehole gravity gradiometer having a suspended dipole mass system includes tuning means for selectively varying the sensitivity of the gravity gradiometer to detect variations in gravity gradient.

As previously noted, the sensitivity of a suspended dipole mass gravity gradiometer to respond to variations in gravity gradient is reduced because of the resistive torque developed by the suspension ribbon resisting the gravitational torque on the dipole mass system resulting from the gravity gradient to be measured. The tuning means for selectively varying the sensitivity of the gravity gradiometer comprises means for varying the metacentric height of the dipole mass system. The metacentric height of the dipole mass system comprises the spaced distance between a metacenter or effective point of rotation of the dipole mass system and the center of gravity of the dipole mass system. The metacentric height can be selectively varied by varying the relationship of center of gravity to that of the dipole mass system with respect to the metacenter of the gravity gradiometer.

BRIEF DESCRIPTION OF THE DRAWINGS

FIG. 1a depicts a cross sectional view of suspension ribbon R viewed along line a—a of FIG. 1.

DESCRIPTION OF THE PREFERRED EMBODIMENT

The present invention relates generally to a borehole gravity gradiometer. Looking first to FIG. 1, a suspended dipole mass gravity gradiometer A is shown. Typically, the gravity gradiometer A includes a dipole mass system D having symmetrically distributed dipole masses m attached to a beam B. One end of a suspension ribbon R is attached to the midpoint of the beam B whereby the dipole mass system D is free to rotate about an axis of rotation in response to a difference in gravitational forces applied to the masses m, i.e., a gravity gradient.

A cross sectional view of the suspension ribbon R along line a—a is shown in FIG. 1a. The suspension ribbon R cross section has dimensions of approximately 0.125 in. by 0.001 in. The rigidity of the suspension ribbon R develops a resistive torque $N_r$ to the torque $N_g$ developed by the gravitational gradient. Hence the angle of deflection $\theta$ of the dipole mass system D from its equilibrium or reference position reflects a balancing of these opposing torques. In this instance, the beam B is deflected from its equilibrium position, i.e., horizontal. To the extent that the resistive torque $N_r$ can be effectively reduced, smaller and smaller gravitational torque $N_g$ will produce the same deflection angle $\theta$ from the equlibrium or reference position.

The deflection angle $\theta$ is proportional to the gravity gradient produced torque $N_g$ and a gain or sensitivity factor S according to $$\theta = S \times N_g \tag{2}$$

In gravity gradiometers, the objective is to increase the gain or sensitivity factor S. The gain factor S implicitly includes the resistive torque $N_r$. It has been found that the gain factor S can be approximated for small angles (generally less than 5°) of deflection $\theta$ according to:

$$S = 1/W(\delta - h) \tag{3}$$

where

W is the total weight of the dipole mass system D;

$\delta$ is the flexure length of the suspension ribbon R, with respect to the point of attachment of the suspension ribbon R to the beam B; and h is the height of the center of gravity of the dipole mass system D with respect to the point of attachment of the suspension ribbon R to the beam B.

Figure 1:
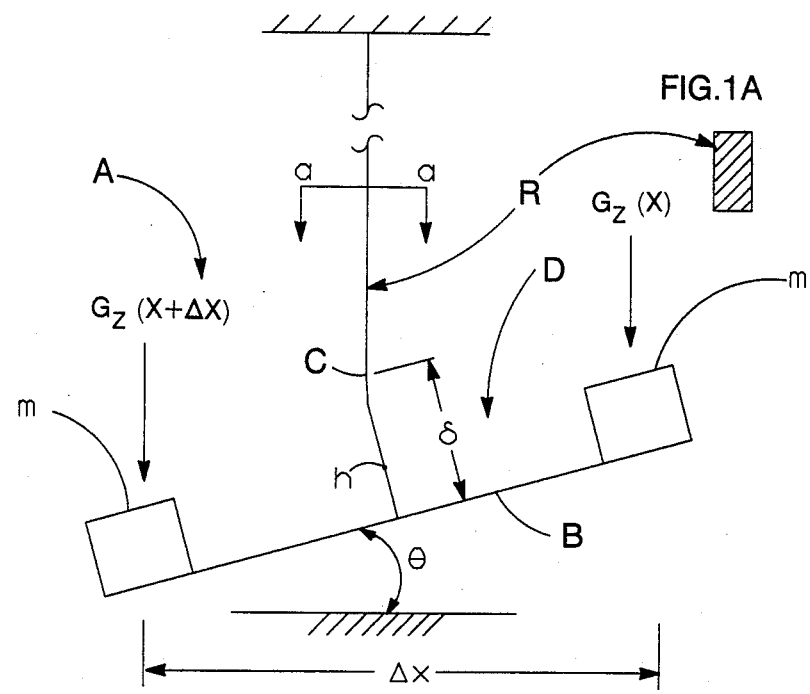
FIG. 1 is a simplified schematic of a suspended dipole mass gravity gradiometer.

As represented in FIG. 1, the flexure length $\delta$ represents that portion of the total length of suspension ribbon R in which substantially all of the bending or flexing thereof occurs and can be approximated by:

$$\delta = (EI/W)^{\frac{1}{2}} \tag{4}$$

where

E is the elastic modulus for the suspension ribbon R;

I is the cross-sectional moment for the suspension ribbon R; and

W is the total weight of the dipole mass system D.

As the center of gravity h approaches $\delta$, the gain factor S can be increased dramatically without having to use a thinner suspension ribbon R. Moreover, the sensitivity or gain factor S for the suspended dipole mass gravity gradiometer A can be expressed as the spaced difference in location of the metacenter C and the center of gravity h of the suspended dipole mass system D.

The metacenter C of the dipole mass system D is defined to be the apparent point about which the dipole mass system D rotates as measured from the point of attachment of the suspension ribbon R to the beam B. In fact, the location of the metacenter C can be closely approximated as being on the suspension ribbon R at a flexure length $\delta$ from the point of attachment of the suspension ribbon R to the beam B. Conveniently, the center of gravity h of the dipole mass system D can also be located on the suspension ribbon R with reference to the point of attachment of the suspension ribbon R to the beam B.

The spaced difference in location of the metacenter C and the center of gravity h is defined as the metacenter height $M_c$, where $M_c = \delta - h$. As the metacentric height $M_c$ increases, the suspended dipole mass gravity gradiometer A becomes more stable and thus less sensitive to variations in gravity gradient, i.e., the gain factor S decreases. As the metacentric height $M_c$ approaches zero, the suspended dipole mass gravity gradiometer A becomes less stable and more sensitive to variations in the gravity gradient, i.e., the gain factor S increases. However, for metacentric heights $M_c$ of zero, the gain factor S is infinite and for metacentric heights $M_c$ less than zero, i.e., the center of gravity h is above the metacenter C, the dipole mass system D becomes unstable.

By selectively varying the metacentric height $M_c$, i.e., the difference between the metacenter C and the center of gravity h, the resistive torque $N_r$ can be minimized to a reproducible and calculable extent. In fact, as the metacentric height $M_c$ approaches 0, there is no net resistive torque $N_r$ and the gain S approaches infinity. Decreases in a metacentric height $M_c$ below 0 lead to an unstable dipole mass system D.

Figure 2:
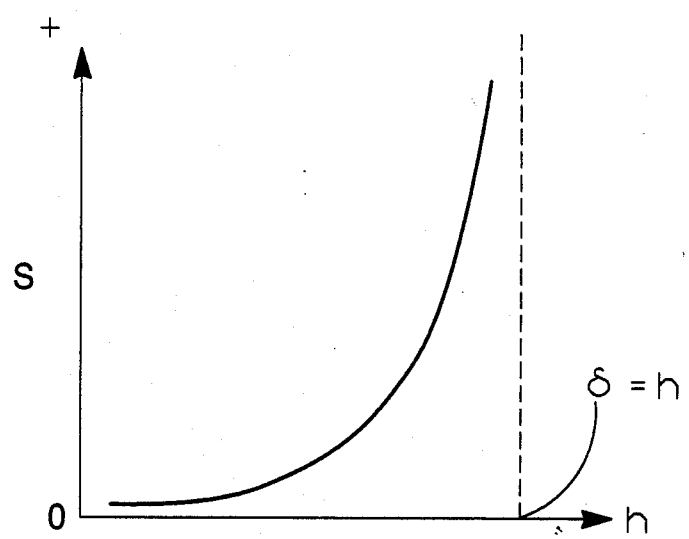
FIG. 2 is a graphical representation of the relationship between the gain factor S and the flexure length $\delta$ of the suspension ribbon R and the center of gravity h of the dipole mass system D.
Figure 3:
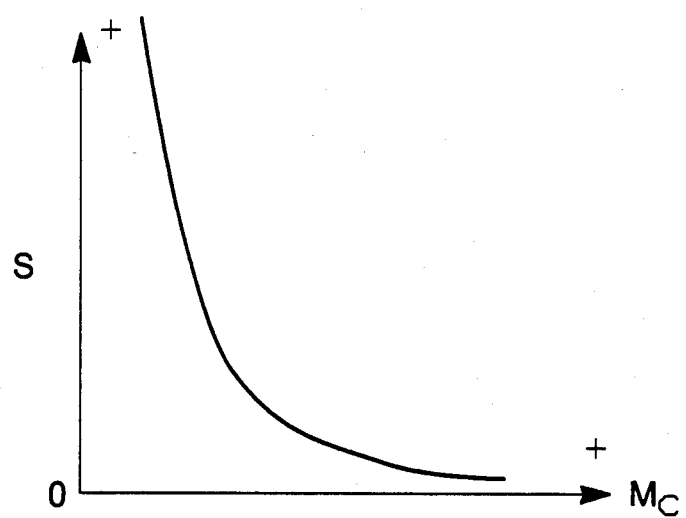
FIG. 3 is a graphical representation of the relationship between the gain factor S and the metacentric height $M_c$ of the dipole mass system D.

The gain factor S can be graphically expressed as a function of either the interrelationship of the $\delta$ and h or the metacentric height $M_c$ as represented in FIGS. 2 and 3, respectively.

Figure 4:
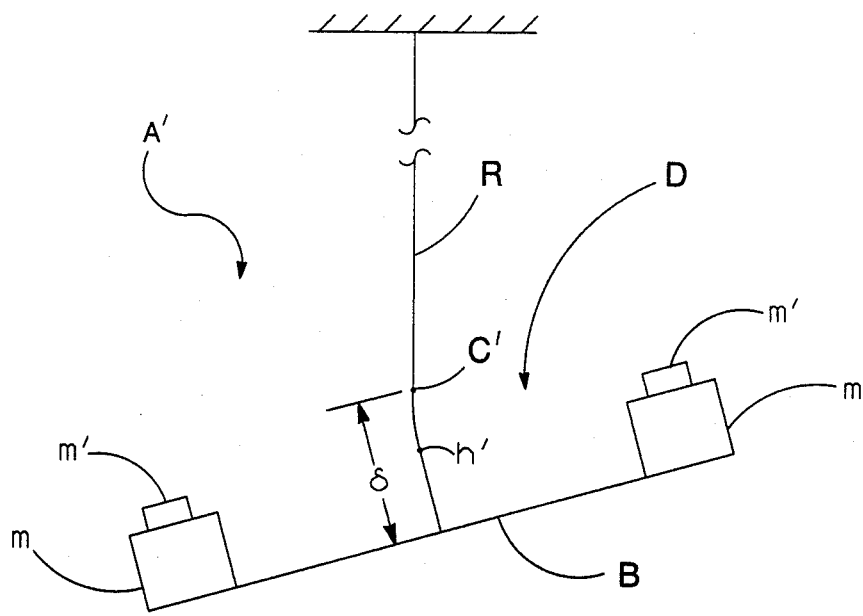
FIG. 4 is a simplified schematic of a suspended dipole mass gravity gradiometer including the tuning means of the present invention.

The gravity gradiometer A of the present invention can be selectively tuned to increase its gain factor S to achieve desired values. A first method for tuning the gravity gradiometer A includes changing the center of gravity h of the dipole mass system D. A gravity gradiometer A' can be tuned by simply adding weighted shims m' to each of the symmetrical masses m as seen in FIG. 4. Since the location of the metacenter C depends upon the total weight W' of the dipole mass system D', it too changes slightly with the added weight of shims m'.

A second method for selectively tuning a gravity gradiometer A" can be achieved by replacing the masses m with the masses m" both of which have the same weight but different volumetric configurations, resulting in a different center of gravity h". This particular technique has the advantage of retaining the original metacenter C while only the center of gravity h" varies. Other embodiments are possible; however, any increases in the gain factor S of the gravity gradiometer A which are the result of varying the relationship of the center of gravity h of dipole mass system D with respect to the metacenter C of the dipole mass system D are understood to be within the scope of the invention as presented herein.

Figure 5:
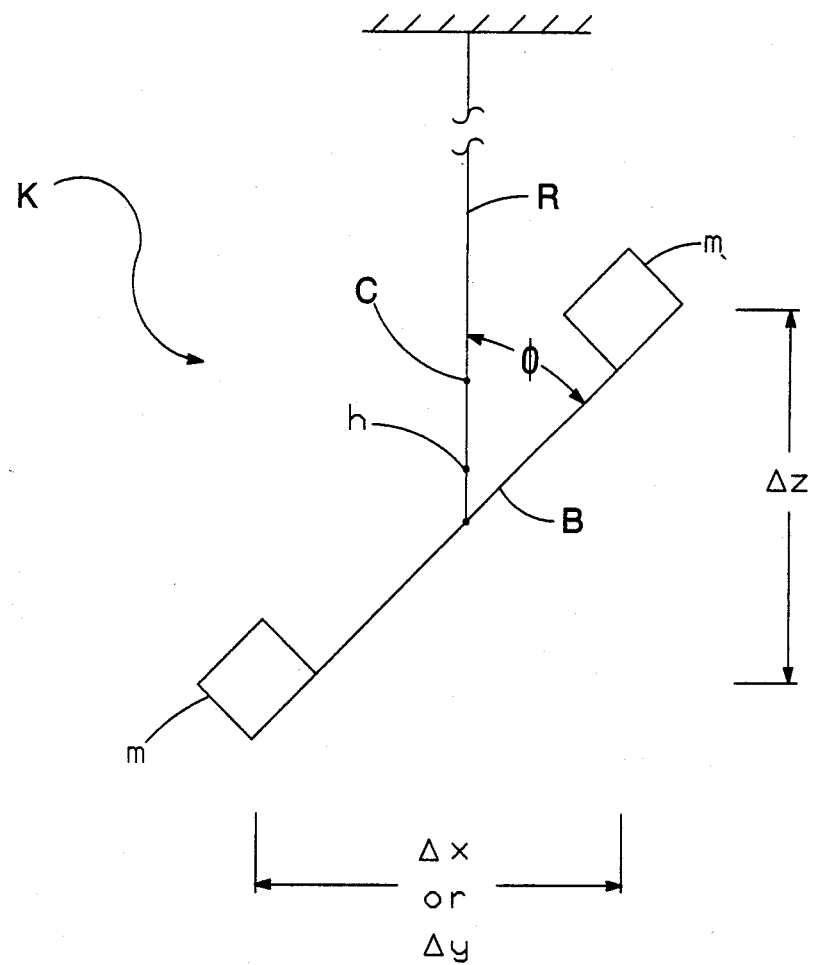
FIG. 5 is a simplified schematic of a preferred embodiment of the suspended dipole mass gravity gradiometer of the present invention.

Looking now to FIG. 5, a preferred embodiment of a tuned gravity gradiometer K is shown. Here the equilibrium or reference position of the beam B is initially inclined from the vertical axis by an angle $\phi$. With this initial reference or equilibrium position of the beam B, the tuned gravity gradiometer K can now detect the gravity gradient along a vertical axis, i.e., $$G_{zz} = \frac{G_z(z + \Delta z) - G_z(z)}{\Delta z} \tag{5}$$

as well as along the horizontal axis, i.e., $$G_{zx} = \frac{G_z(x + \Delta x) - G_z(x)}{\Delta x} \tag{6}$$

or $$G_{zy} = \frac{G_z(y + \Delta y) - G_z(y)}{\Delta y}$$

since the dipole masses m are now separated by a vertical distance $\Delta z$ as well as horizontal distances $\Delta x$ or $\Delta y$. It is preferred that the angle $\phi$ be 45° from vertical.

The description of the tuned borehole gravity gradiometer of the present invention has been limited to describing means for selectively tuning the sensitivity thereof to detect variations in the earths gravity gradient. However, a field instrument would require means for beam position clamping and leveling, as well as beam position feedback control whereby the gravity gradient torque rather than deflection angle $\theta$ could be measured. Such components are readily available in the commercial market and need not be further discussed.

The foregoing disclosure and description of the invention are illustrative and explanatory thereof and various changes may be made without departing from the spirit of the invention as set forth in the claims below.

We claim:

1. A tuned borehole gravity gradiometer for detecting variations in gravity gradient comprising:
    a suspended dipole mass system having symmetrically distributed dipole masses and suspension means for suspending the dipole masses such that the gravity gradient to be measured produces an angular displacement about a rotation axis of the dipole mass system from a reference position; and
    tuning means with the dipole mass system for selectively varying the sensitivity to angular displacements with respect to the rotation axis of the dipole mass system to variations in gravity gradient, wherein the tuning means includes means for selectively varying the metacentric height of the dipole mass system.

2. The apparatus of claim 1 wherein the tuning means includes:
    means for selectively varying the center of gravity of the dipole mass system with respect to the metacenter of the dipole mass system.

3. The apparatus of claim 2 wherein the metacenter of the dipole mass system is a spaced distance $\delta$ from the point of attachment of the suspension means to the dipole mass system according to:

$$\delta = (EI/W)^{\frac{1}{2}}$$

where
    E is the elastic modulus for the suspension means,
    I is the cross-sectional moment of inertia of the suspension means, and
    W is the total weight of the dipole mass system.

4. The apparatus of claim 1 wherein the tuning means selectively varies the sensitivity S of the gravity gradiometer according to $$S = 1/WM_c,$$

where
    W is the total weight of the dipole mass system and $M_c$ is the metacentric height of the dipole mass system.

5. The apparatus of claim 3 wherein the sensitivity S of the gravity gradiometer to variations in gravity gradient varies according to:

$$S = 1/W(\delta - h),$$

where
    W is the total weight of the dipole mass system, $\delta$ = the spaced distance of the metacenter of the dipole mass system with respect to the point of attachment of the suspension means to the dipole mass system, and h = the spaced distance of the center of gravity of the dipole mass system with respect to the point of attachment of the suspension means to the dipole mass system.

6. The apparatus of claim 1 wherein the sensitivity S to the angular displacement $\theta$ with respect to the rotation axis of the dipole mass system from a reference position in response to the gravity gradient to be measured is determined according to:

$$\theta = S \times N_g,$$

where
    $N_g$ is the torque on the dipole mass system from the gravity gradient to be measured.

7. A method for selectively tuning the sensitivity of a suspended dipole mass gravity gradiometer to respond to a gravity gradient to be measured including the step of:
    selectively varying the metacentric height of the suspended dipole mass gravity gradiometer.

8. The method of claim 7 wherein the sensitivity S is varied according to:

$$S = 1/WM_c$$

where
    W is the total weight of the suspended dipole mass gravity gradiometer,
    $M_c$ is the metacentric height of the suspended dipole mass gravity gradiometer.

9. A method for selectively tuning the sensitivity of a suspended dipole mass gravity gradiometer to respond to a gravity gradient to be measured including the step of:
    selectively varying the center of gravity of the dipole mass gravity gradiometer with respect to the metacenter of the dipole mass gravity gradiometer.

10. The method of claim 9 wherein the sensitivity S is varied according to:

$$S = 1/W(\delta - h)$$

where
    h is the center of gravity of the suspended dipole mass gravity gradiometer,
    $\delta$ is location of the metacenter of the suspended dipole mass gravity gradiometer.

* * * * *